No. 39,192. W. WOODBURY. PATENTED JULY 7, 1863.
FISHING TACKLE FOR DEEP SEA FISHING.
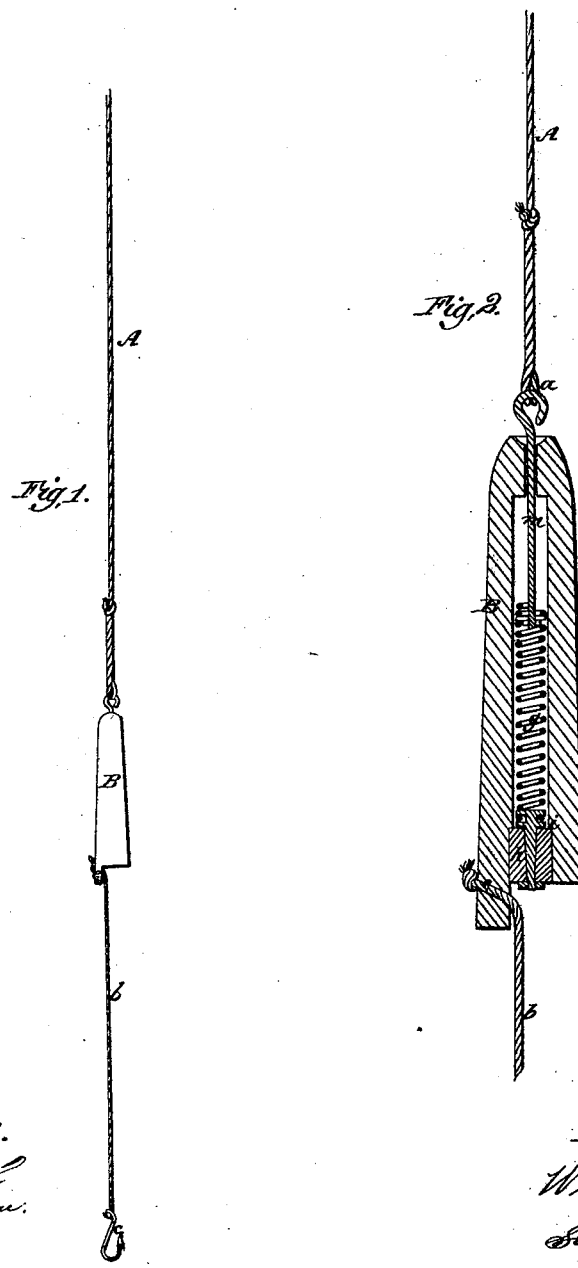
Witnesses.
Inventor.

UNITED STATES PATENT OFFICE.

WILLIAM WOODBURY, OF GLOUCESTER, MASSACHUSETTS.

IMPROVEMENT IN FISHING-TACKLE FOR DEEP-SEA FISHING.

Specification forming part of Letters Patent No. 39,192, dated July 7, 1863; antedated October 2, 1862.

*To all whom it may concern:*

Be it known that I, WILLIAM WOODBURY, of Gloucester, in the county of Essex and State of Massachusetts, have invented certain Improvements in Fishing-Tackle for Cod and other Deep-Sea Fishing, of which the following is a full, clear, and exact description, reference being had to the accompanying drawings, making part of this specification, in which—

Figure 1 is a view of a line with a lead or sinker, such as is used for cod-fishing; Fig. 2, a section through the sinker, showing an application of my improvement.

In fishing for cod and other deep-sea fishing, where a considerable length of line is used, it frequently occurs that when a fish strikes or seizes the hook that the line is so unyielding or inelastic in the direction of its length that as the fish springs he tears himself loose from the hook, which would not happen if the line yielded quickly for the first instant of time after the hook took effect. To provide this requisite is the object of my present invention, which consists in introducing a spring in some convenient position not far removed from the hook.

That others skilled in the art may understand and use my invention, I will describe the manner in which I have carried it out.

In the said drawings, A is the fishing-line, to which is attached at $a$ the lead or sinker B. Another short line, $b$, of about two feet in length, to which the hook $c$ is fastened, is attached at $e$ to the lower end of the sinker. This sinker, which is made of lead of the form shown, is bored out longitudinally, and a spring, $g$, of brass or galvanized iron or other suitable material, is introduced into it, the spring being attached at its lower end to a block, $h$, which rests against a shoulder, $i$, and at its upper end to a rod, $m$, to which the line A is attached. By this arrangement, when the fish strikes the hook $c$, the spring $g$ will yield and give an elasticity to the line, which will in many cases prevent the hook from tearing out and the fish from escaping.

Instead of placing the spring $g$ within the sinker, which I consider the most convenient place for it, it may be attached to one end of the sinker or be placed nearer to the hook without departing from the spirit of my invention.

What I claim as my invention, and desire to secure by Letters Patent as an improvement in fishing-tackle, is—

Introducing the spring $g$, or its equivalent, into the length of the fishing-line in the neighborhood of the hook, substantially in the manner and for the purpose specified.

WILLIAM WOODBURY.

Witnesses:
A. SULLAR,
JOHN L. BABSON, Jr.